United States Patent
Herrala et al.

(10) Patent No.: US 10,914,411 B2
(45) Date of Patent: Feb. 9, 2021

(54) ISOLATED FLEXIBLE FLUID CONNECTION SYSTEM

(71) Applicant: GM GLOBAL TECHNOLOGY OPERATIONS LLC, Detroit, MI (US)

(72) Inventors: Kevin W. Herrala, Grand Blanc, MI (US); Michael Kaczmar, Farmington Hills, MI (US); Martin K Scott, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 340 days.

(21) Appl. No.: 16/007,388

(22) Filed: Jun. 13, 2018

(65) Prior Publication Data

US 2019/0383429 A1 Dec. 19, 2019

(51) Int. Cl.
*F16L 27/10* (2006.01)
*F16L 23/02* (2006.01)
*F16L 23/18* (2006.01)

(52) U.S. Cl.
CPC .............. *F16L 23/02* (2013.01); *F16L 23/18* (2013.01)

(58) Field of Classification Search
CPC ....... F16L 23/02; F16L 23/024; F16L 23/028; F16L 23/0286; F16L 23/12; F16L 27/10; F16L 27/1012; F16L 27/1021; F16L 27/107
USPC ..... 285/136.1, 137.11, 139.1, 223, 235, 236, 285/237, 412
See application file for complete search history.

(56) References Cited

U.S. PATENT DOCUMENTS

| | | | | |
|---|---|---|---|---|
| 2,339,332 A * | 1/1944 | Hauf | ................... | F16L 27/1012 285/342 |
| 4,335,905 A * | 6/1982 | Bac | ........................ | B65D 88/54 285/136.1 |
| 5,431,457 A * | 7/1995 | Youngs | ................. | F16L 41/086 285/136.1 |
| 5,967,567 A * | 10/1999 | Nordstrom | ................ | F16L 5/06 285/139.1 |
| 6,079,751 A | 6/2000 | Youngs | | |
| 6,158,782 A * | 12/2000 | Stanley | .................... | F16L 23/12 285/50 |
| 6,173,997 B1 * | 1/2001 | Nordstrom | ................ | F16L 5/06 285/139.1 |
| 6,189,550 B1 * | 2/2001 | Stickel | .................... | F04B 53/00 134/174 |
| 2004/0245775 A1 * | 12/2004 | Muroi | ................... | F16L 27/107 285/223 |
| 2007/0216162 A1 * | 9/2007 | Ennin | ..................... | F16L 47/14 285/406 |
| 2008/0042430 A1 * | 2/2008 | Ichikawa | ............... | F16L 27/107 285/61 |

(Continued)

*Primary Examiner* — Aaron M Dunwoody
(74) *Attorney, Agent, or Firm* — Lorenz & Kopf LLP

(57) ABSTRACT

Flexible fluid connection systems are provided with misalignment management, vibration attenuation and compact packaging for a variety of applications. A fluid connection system includes a component that operates using a fluid. The component defines a surface and a passageway containing the fluid and opening through the surface. A fluid line is configured to convey the fluid relative to the component. A connector is made of a flexible material and is connected with the component and with the fluid line. The connector is positioned against the surface and has an end spaced away from the surface through which the fluid line is received.

20 Claims, 5 Drawing Sheets

(56) References Cited

U.S. PATENT DOCUMENTS

2008/0100060 A1\* 5/2008 Hayashi .............. F16L 27/1012
285/148.8
2015/0233505 A1 8/2015 Hale et al.
2018/0045149 A1\* 2/2018 Williams ......... F02M 35/10157

\* cited by examiner

ISOLATED FLEXIBLE FLUID CONNECTION SYSTEM

TECHNICAL FIELD

The present disclosure generally relates to systems for connecting a fluid line to another component, and more particularly, relates to a fluid connection system that is flexible, provides vibration isolation, and manages misalignment.

INTRODUCTION

A wide array of manufactured products, machinery and equipment use conduits to convey a working fluid between components of a fluid system. The conduits may be defined internally in the components, or when the components are spaced apart from each other, fluid lines may be used to connect them together. The fluid lines may take the form of hoses, tubing, pipes, or other structures. Particularly when the fluid lines are rigid, making the connections may be difficult due to slight misalignment with mating features on the connected component.

Accordingly, it is desirable to provide connection systems that facilitate making connections for fluid lines. Furthermore, other desirable features and characteristics of the present invention will become apparent from the subsequent detailed description and the appended claims, taken in conjunction with the accompanying drawings and the foregoing technical field and introduction.

SUMMARY

Flexible fluid connection systems are provided with misalignment management, vibration attenuation, and compact packaging for a variety of applications. In a number of embodiments, a fluid connection system includes a component that operates using a fluid. The component defines a surface and a passageway containing the fluid and opening through the surface. A fluid line is configured to convey the fluid relative to the component. A connector is made of a flexible material and is connected with the component and with the fluid line. The connector is positioned against the surface and has an end spaced away from the surface through which the fluid line is received.

In other embodiments, the connector has a body with a first segment shaped as a hollow cylinder and a second segment integral with the first segment and shaped as a disk with a hollow center, so that the second segment forms a flange on the body.

In other embodiments, a collar is positioned against the flange so that the flange is compressed between the collar and the surface.

In other embodiments, a plurality of fasteners extend through the collar and the flange and are threaded into the component.

In other embodiments, a compression limiter extends in the flange and a fastener extends through the compression limiter. The compression limiter has a length and the flange has a width in an uncompressed state. The length is less than the width.

In other embodiments, the fluid line includes a bead disposed within the first segment.

In other embodiments, a clamp extends around the first segment and is configured to compress the first segment against the fluid line.

In other embodiments, the end is configured to move perpendicular relative to the fluid line to align with the fluid line.

In other embodiments, a number of threaded fasteners secure the connector to the component.

In other embodiments, the connector has a durometer hardness of less than 100 A.

In another embodiment, a fluid connection system includes a component that is rigidly fixed in position and that operates using a fluid. The component defines a surface and a passageway that conveys the fluid and opens through the surface. A fluid line is rigid and is configured to convey the fluid relative to the component. A connector is made of a flexible material and is fixed to the component and to the fluid line. The connector is positioned against the surface and the fluid line is connected to the end.

In other embodiments, the connector includes a body with a first segment shaped as a hollow cylinder and a second segment integral with the first segment and shaped as a disk with a hollow center. The second segment forms a flange on the body and an opening is defined completely through the body through the first and second segments.

In other embodiments, a collar is positioned against the flange and is configured to compress the flange between the collar and the surface.

In other embodiments, a number of fasteners extend through the collar, through the flange and are threaded into the component to compress the flange.

In other embodiments, a compression limiter extends within the flange and one of the fasteners extends through the compression limiter. The compression limiter has a length and the flange has a width in an uncompressed state. The length is less than the width so that the flange is compressed as the compression limiter is forced against the collar and the surface.

In other embodiments, the fluid line includes a bead disposed within the first segment that extends outward against the first segment.

In other embodiments, a clamp extends around the first segment, is positioned between the bead and the end, and is configured to compress the first segment against the fluid line.

In other embodiments, the end is configured to move relative to the component to align the first segment with the fluid line.

In other embodiments, the component comprises a pump of a vehicle cooling system.

In additional embodiments, a fluid connection system includes a pump configured to pump an engine coolant. The pump defines a surface and a passageway that is configured to convey the engine coolant. The passageway opening through the surface. A fluid line is configured to convey the engine coolant relative to the pump. The fluid line has an end that is spaced apart from the pump. A connector is made of a flexible material and includes a body with a first segment shaped as a hollow cylinder and a second segment integral with the first segment and shaped as a disk with a hollow center. The second segment forms a flange on the body. An opening is defined completely through the body, through the first and second segments. The connector is fixed to the pump and to the fluid line.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application or its uses. Furthermore, there is no intention to be bound by any expressed or implied theory presented in the preceding technical field, introduction, brief summary or the following detailed description.

In one or more example implementations of the disclosed isolated flexible fluid connection system, misaligned connection facilitation is provided, along with isolation. The fluid connection system provides misalignment management, vibration attenuation and compact packaging for a variety of applications. In general, a fluid connection system includes a component that operates using a fluid. The component defines a surface and defines a passageway for the fluid that opens through the surface. A fluid line is configured to convey the fluid relative to the component. A connector is made of a flexible material and is connected with the component and with the fluid line. The connector is positioned against the surface and has an end spaced away from the surface through which the fluid line is received.

The current description relates to fluid system connections that may be described in the context of a mechanical system application and in particular, a vehicle coolant system with connected fluid lines for purposes of demonstrating an example. During assembly, it may be useful to provide management of misalignment conditions. For example, to effectively make a connection between a coolant line and the coolant pump, fasteners may need to be applied and secured to complete the connection, including when the fluid line is misaligned with the coolant pump.

The present disclosure is not limited to coolant pump applications or to vehicles in general, but rather, also encompasses any application where greater flexibility in making fluid connections is desired. Accordingly, the teachings of the present disclosure are applicable to fluid systems in a variety of applications, such as vehicle systems, various product systems, machinery and equipment systems, and others.

Figure 1:
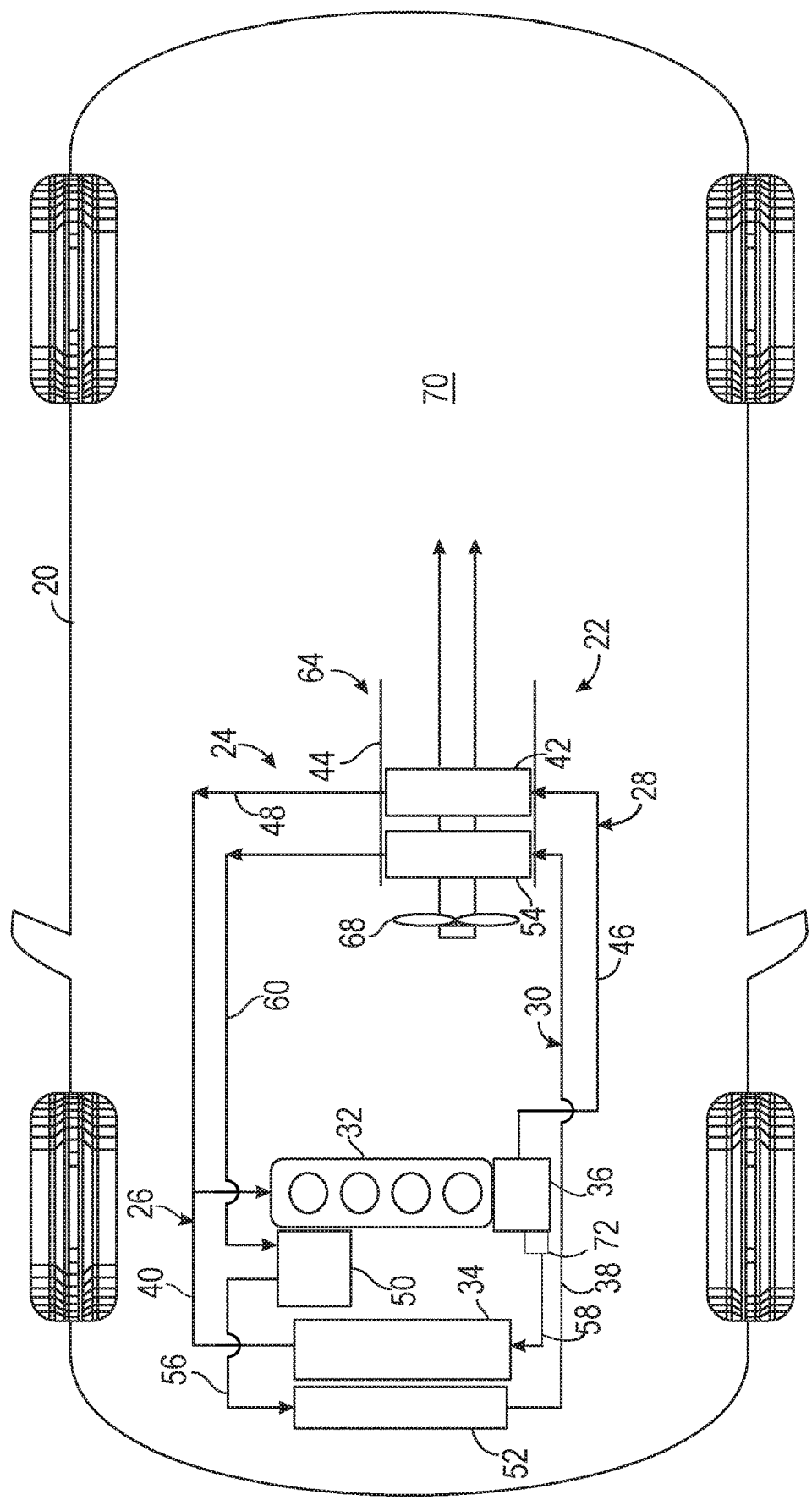
FIG. 1 illustrates an application for a fluid connection system according to an exemplary embodiment.

In an exemplary embodiment of the present disclosure, a vehicle application is illustrated as shown in FIG. 1. A vehicle 20 includes fluid systems with which the disclosed isolated flexible fluid connection system is used. In the current example, a complex interrelated fluid system 22 is configured as a heating, ventilating and air conditioning (HVAC) system 24. In general, the HVAC system 24 is associated with an engine cooling system 26, and includes a cabin heating system 28 and an air conditioning system 30. The disclosed isolated flexible fluid connection system may be used with any or all of the engine cooling system 26, the cabin heating system 28, the air conditioning system 30, and/or other fluid systems of the vehicle 20.

The engine cooling system 26 generally includes an engine 32 that supplies propulsion power for the vehicle 20 through which coolant is circulated to collect heat form the engine, a radiator 34 located at the front of the vehicle 20 through which the coolant is circulated to expel heat, and a pump 36 configured to create a pressure differential in the cooling system 26 to circulate the coolant. In addition, a thermostat (not shown) may be included in the cooling system 26 to control flow through the engine 32, and a bypass (not shown) may be included around the radiator 34. One fluid line 38 is coupled between the pump 36 and the radiator 34 to route fluid flow therebetween. Another fluid line 40 is coupled between the radiator 34 and the engine 32 to return fluid flow from the radiator 34.

The heating system 28 generally includes the engine 32 through which coolant is circulated to collect heat, a heat exchanger 42 located in a duct 44 of the vehicle 20, and the pump 36. In addition, a control valve (not shown) may be included in the heating system 28 to control flow through the heat exchanger 42. One fluid line 46 is coupled between the pump 36 and the heat exchanger 42 to route fluid flow there between. Another fluid line 48 is coupled between the heat exchanger 42 and the engine 32 to return fluid flow from the heat exchanger 42.

The air conditioning system 30 generally includes a compressor 50 driven by the engine 32, a condenser 52 located at the front of the vehicle 20, and an evaporator 54 located in the duct 44. One fluid line 56 is coupled between the compressor 50 and the condenser 52 to route fluid flow therebetween. Another fluid line 58 is coupled between the condenser 52 and the evaporator 54, and another fluid line 60 is connected between the evaporator 54 and the compressor 50. An expansion valve or container (not shown) may be included in the fluid line 58. Refrigerant is circulated by the compressor 50, through the condenser 52, and the evaporator 54 in a refrigeration cycle.

The heat exchanger 42, the evaporator 54 and the duct 44 are arranged in a HVAC module 64 that includes a blower 68. The blower 68 moves air through the duct 44 over the evaporator 54 and heat exchanger 42 which in this example are arranged in series. The air is then delivered to the cabin 70 of the vehicle 20. The air moving through the duct 44 is cooled by the evaporator 54 when the HVAC system 24 is operating in air conditioner mode and is heated when the HVAC system 24 is operating in a heater mode. The cooled or heated air moves into the cabin 70 providing space conditioning for comfort of the occupants.

In the current example, a fluid connection system 72 is included at the connection between the pump 36 and the fluid line 38. It will be appreciated that similar fluid connection systems may be used at other locations in the vehicle 20, such as the connection between the fluid line 40 and the radiator 34, or at any other connection point that involves the connection between a fluid line and another component. In addition, similar fluid connection systems may be used for other types of fluids such as air or gas, in addition to those that use liquid.

Referring to FIGS. 2-6, the fluid connection system 72 is shown in greater detail and generally provides a fluid tight connection between the fluid line 38 and the pump 36, which is a component that operates using a fluid. In this example, the fluid line 38 is a rigid pipe. In other embodiments the fluid line 38 may be tubing, hose, duct or of another form. In addition, the fluid line 38 may be constructed of multiple components running between the pump 36 and the radiator 34, which may take more than one form of conduit. The pump 36, and specifically the pump housing 74 is rigid and is connected with, or formed together with, the engine 32. The fluid line 38 has an end 76 that is spaced apart from the pump 36 and that has a bead 78 formed around its circumference and projecting outward from the wall 80 of the fluid line 38. The pump housing 74 defines a passageway 82 that is intended to register with the conduit 84 defined by the inside of the wall 80 so that coolant readily flows between the two. The pump housing 74 also includes a number of apertures 86 distributed around the passageway 82, which in this example are threaded to receive fasteners 88.

Figure 2:
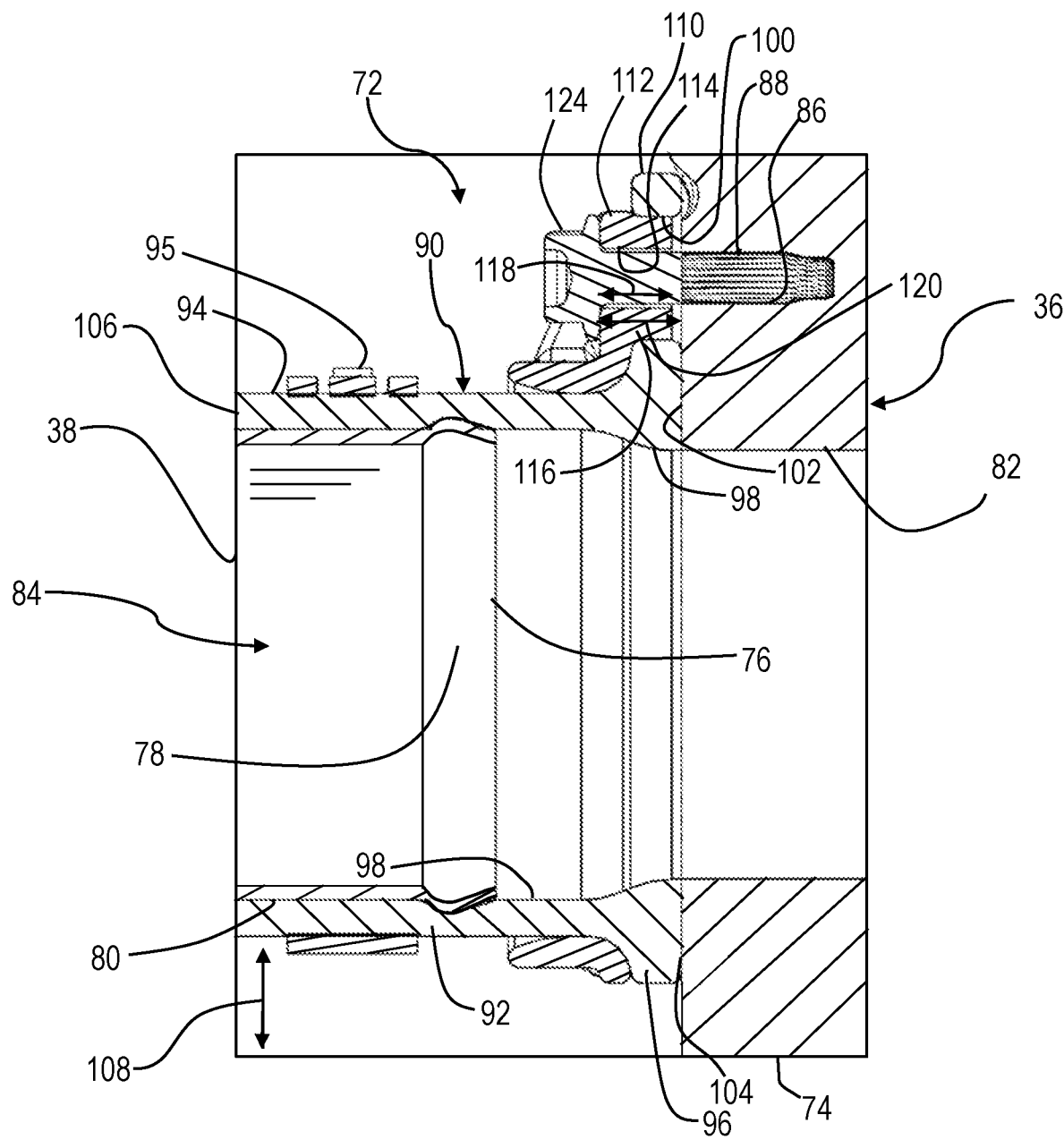
FIG. 2 is a schematic cross-sectional illustration of a fluid connection system according to the exemplary embodiment.
Figure 3:
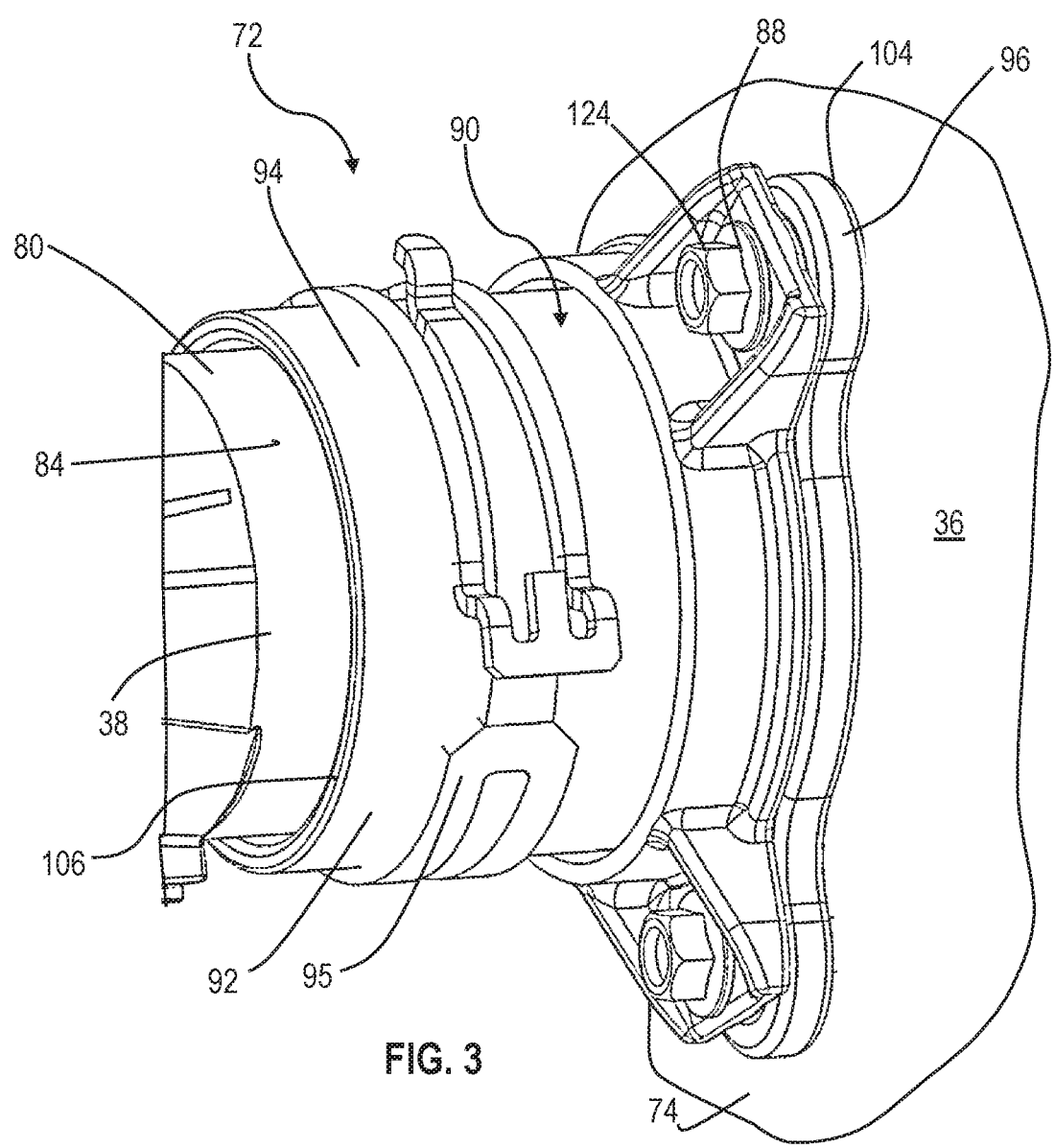
FIG. 3 is a perspective illustration of a fluid connection system according to the exemplary embodiment.
Figure 4:
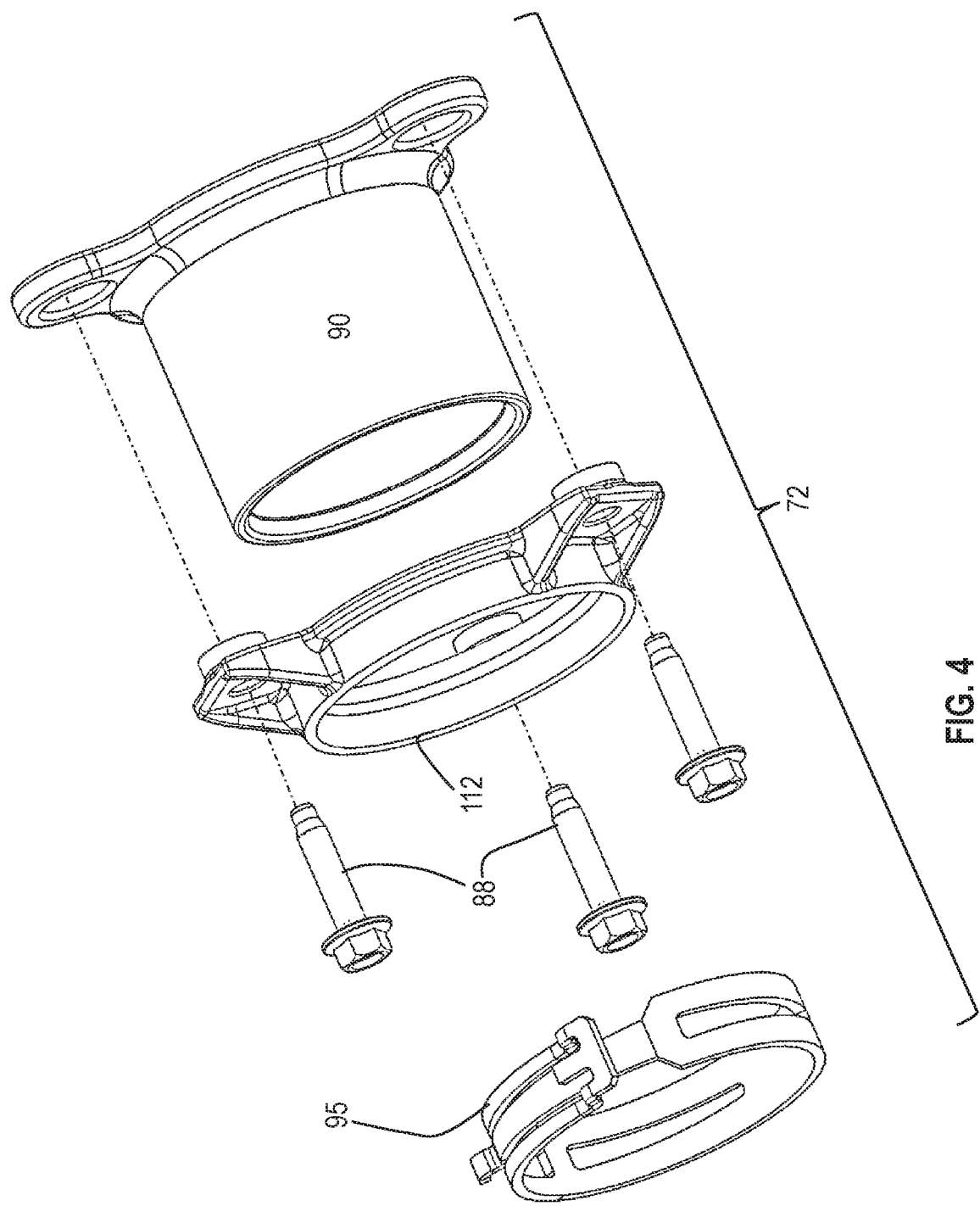
FIG. 4 is an exploded view illustration of the fluid connection system according to the exemplary embodiment.
Figure 6:
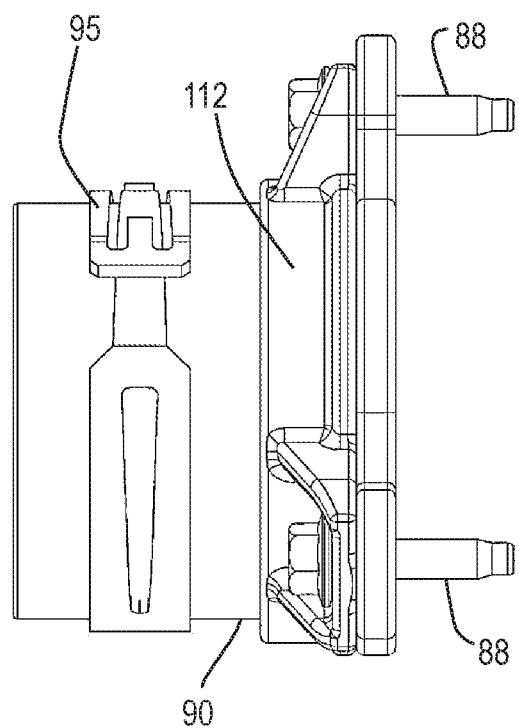
FIG. 6 is a side view illustration of the fluid connection system according to the exemplary embodiment.
Figure 5:
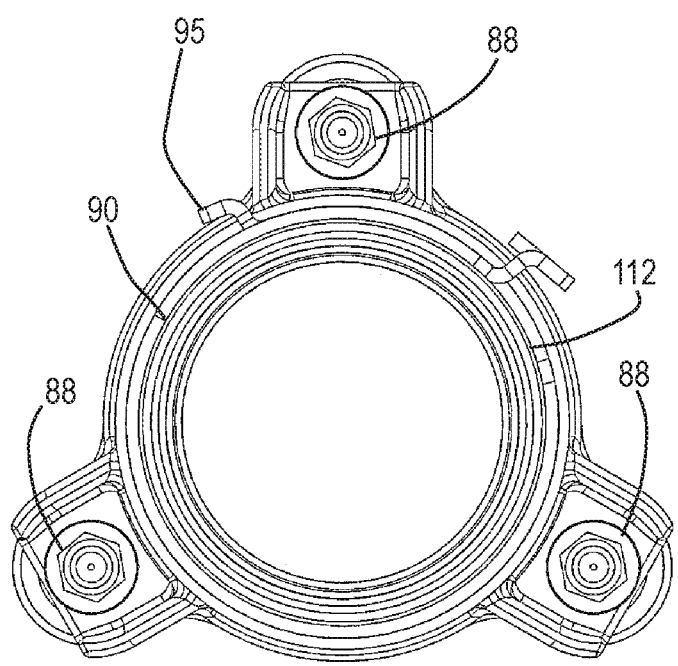
FIG. 5 is an end view illustration of the fluid connection system according to the exemplary embodiment.

The fluid connection system 72 includes a connector 90 as shown in FIGS. 2-6, and that, as indicated in FIGS. 2 and 3, has a body 92 with a segment 94 that is formed in the shape of a hollow cylinder and an integral segment 96 that is formed in the shape of disc with a hollow center so that an opening 98 extends completely through the body 92, including through both segments 94, 96. A number of openings 100 extend through the segment 96 and are distributed so that one aligns with each of the apertures 86. The body 92 is formed of a material that is flexible such as natural or synthetic rubber, silicone, etc. For example, the body 92 may be a polymeric elastomer with a durometer hardness of between 50 A and 100 A, and specifically approximately 70 A, so that it is flexible but secure. The segment 96 is positioned against the side 102 of the pump housing 74 so that the opening 98 is aligned with the passageway 82, and the segment 94 extends away from the side 102 and toward the fluid line 38. The body 92 provides a seal against the side 102 at a sealing interface 104. The end 106 of the segment 94 is movable in the direction 108 that is generally perpendicular relative to the fluid line 38 and to the passageway 82, as the body 92 flexes for alignment with the fluid line 38.

The segment 96 forms a flange 110 on the body 92, which is positioned against the pump housing 74. A collar 112, shown in FIGS. 2-6, in the form of an annular plate with a hollow center encircles the segment 94 and is positioned against the segment 96 at the flange 110. The collar 112 is formed of a rigid material such as metal or plastic so that it applies an even pressure when the fasteners 88 are tightened. The collar 112 includes a number of openings 114, indicated in FIG. 2, that are distributed so that one aligns with each of the openings 100. Each of the openings 100 contains a compression limiter 116 in the form of a hollow cylinder with a length 118 that is less than the thickness 120 of the uncompressed segment 96. A fastener 88 is received through each of the openings 114, 100 and also extends through a respective compression limiter 116. Each fastener 88 is threaded into a respective aperture 86. Each fastener 88 includes a head 124 that is tightened against the collar 112 forcing the collar 112 to compress the flange 110 against the side 102 until the compression limiter is forced against each of the collar 112 and the side 102 at which point the compression of the flange 110 is limited. The length of the compression limiters 116 is selected based on the working pressures in the passageway 82 and the type of fluid contained therein, to provide a secure seal at the sealing interface 104, and required tension on the fasteners 88.

As shown in FIGS. 2 and 3, the fluid line 38 is received within the segment 94 through the end 106 so that the conduit 84 is open to the passageway 82 through the opening 98. The bead 78 applies a force against the segment 94 and a clamp 95 shown in FIGS. 2-6, is applied around the segment 94 as indicated in FIGS. 2 and 3, between the bead 78 and the end 106, forcing the segment 94 against the fluid line 38 to provide a secure fluid-tight seal. Flexibility of the body 92 allows the end 106 to move in the direction 108 providing position variation tolerance to assist with connection in cases of misalignment between the fluid line 38 and the pump housing 74. For example, misalignment may occur due to geometric dimensioning and tolerancing variation. The direction 108 is perpendicular to the fluid line 38 and to the passageway 82. In addition, the direction 108 indicates movement of the end 106 relative to the pump 36. By requiring only one clamp 95, the fluid connection system 72 has reduced packaging space requirements for flexible fluid couplings with regard to the distance from the surface 102 to the end 106. The flexible body 92 provides robust attachment to the pump housing 74 that manages misalignments, and provides a secure sealing interface 104. Low stiffness of the body 92 provides vibration isolation between the fluid line 38 and the pump 36.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fluid connection system comprising:
   a component configured for fluid conveying operation, the component defining a surface and a passageway opening through the surface;
   a fluid line configured for coupling relative to the component;
   a connector, comprising a flexible material forming a body disposed against the surface and defining a flange segment with a number of fastener openings; and
   a collar encircling the body, the collar including a number of extending flanges each with a compression limiter that is cylindrical in shape, one of the compression limiters extending into a respective one of the number of fastener openings,
   wherein each compression limiter has a length and the flange segment has a width in an uncompressed state, wherein the length is less than the width,
   wherein the collar is configured to compress the connector against the component until the compression limiter is forced against the component limiting compression of the connector;
   wherein the connector is connected with the component by the collar and is connected with the fluid line, the connector positioned against the surface and having an end spaced away from the surface through which the fluid line is received.

2. The system of claim 1, wherein the connector comprises a body with a first segment shaped as a hollow cylinder and a second segment integral with the first segment and shaped as a disk with a hollow center so that the second segment forms the flange segment on the body.

3. The system of claim 2, wherein the flange segment is compressed between the number of extending flanges and the surface.

4. The system of claim 3, comprising a number of fasteners extending through the collar and the fastener openings, the number of fasteners threaded into the component.

5. The system of claim 4, wherein the number of extending flanges comprise three extending flanges.

6. The system of claim 5, wherein the fluid line includes a bead disposed within the first segment.

7. The system of claim 6, comprising a clamp extending around the first segment adjacent the bead and configured to compress the first segment against the fluid line.

8. The system of claim 7, wherein the end is configured to move perpendicular relative to the fluid line to align with the fluid line.

9. The system of claim 1, comprising a number of threaded fasteners securing the connector to the component.

10. The system of claim 1, wherein the connector has a durometer hardness of less than 100 A.

11. A fluid connection system comprising:
- a component that is rigidly fixed in position and that operates using a fluid, the component defining a surface and a passageway conveying the fluid and opening through the surface;
- a fluid line that is rigid and that is configured to convey the fluid relative to the component;
- a connector, comprising a flexible material and defining a number of fastener openings, the connector fixed to the component and to the fluid line, the connector positioned against the surface and having an end spaced away from the surface to which the fluid line is connected;
- a collar encircling the connector, the collar including a number of extending compression limiters each cylindrical in shape, one of the compression limiters extending into a respective one of the number of fastener openings,
- wherein each compression limiter has a length and the connector has a width adjacent the surface and in an uncompressed state, wherein the length is less than the width,
- wherein the collar is configured to compress the connector against the component until the compression limiter is forced against the surface limiting compression of the connector.

12. The system of claim 11, wherein the connector comprises a body with a first segment shaped as a hollow cylinder and a second segment integral with the first segment and shaped as a disk with a hollow center so that the second segment forms a flange on the body and an opening is defined completely through the body through the first and second segments.

13. The system of claim 12, wherein the collar is positioned against the flange, the collar configured to compress the flange between the collar and the surface.

14. The system of claim 13, comprising a number of fasteners extending through the collar, through the flange and threaded into the component to compress the flange.

15. The system of claim 14, wherein each compression limiter extends within the flange and one of the fasteners extends through a respective one of the compression limiters, wherein each of the compression limiters is forced against the surface.

16. The system of claim 15, wherein the fluid line includes a bead disposed within the first segment and extending outward against the first segment.

17. The system of claim 16, wherein the first segment has an end, and comprising a clamp extending around the first segment, positioned between the bead and the end, and configured to compress the first segment against the fluid line.

18. The system of claim 17, wherein the connector includes an end opposite the surface, wherein the end is configured to move relative to the component to align the first segment with the fluid line.

19. The system of claim 11, wherein the component comprises a pump of a vehicle cooling system.

20. A fluid connection system comprising:
- a pump configured to pump an engine coolant, the pump defining a surface and a passageway that is configured to convey the engine coolant, the passageway opening through the surface;
- a fluid line configured to convey the engine coolant relative to the pump, the fluid line having an end that is spaced apart from the pump;
- a connector, comprising a flexible material and a body with a first segment shaped as a hollow cylinder and a second segment integral with the first segment and shaped as a disk with a hollow center so that the second segment forms a flange on the body, wherein an opening is defined completely through the body through the first and second segments, and the connector is fixed to the pump and to the fluid line.

* * * * *